(12) United States Patent
Flores Lumbreras

(10) Patent No.: US 7,744,339 B2
(45) Date of Patent: Jun. 29, 2010

(54) EOLIC ENERGY TRANSFORMATION TOWER

(76) Inventor: Lorenzo Flores Lumbreras, Escultor Daniel, 3 - 6°D, 26006 Logroño La Rioja (ES)

( * ) Notice: Subject to any disclaimer, the term of this patent is extended or adjusted under 35 U.S.C. 154(b) by 335 days.

(21) Appl. No.: 11/588,382

(22) Filed: Oct. 27, 2006

(65) Prior Publication Data

US 2007/0274830 A1    Nov. 29, 2007

(30) Foreign Application Priority Data

May 25, 2006    (ES) ................................ 200601498

(51) Int. Cl.
*F03D 7/06*    (2006.01)
(52) U.S. Cl. .......................................... 415/4.2; 290/44
(58) Field of Classification Search ................... 415/4.2, 415/4.4, 907; 290/44
See application file for complete search history.

(56) References Cited

U.S. PATENT DOCUMENTS

| | | | |
|---|---|---|---|
| 1,460,114 A * | 6/1923 | Shelton | ....................... 415/4.2 |
| 1,935,097 A | 11/1933 | Nelson | |
| 4,486,143 A * | 12/1984 | McVey | ....................... 415/164 |
| 4,650,403 A * | 3/1987 | Takacs | ..................... 416/197 A |
| 6,629,815 B2 * | 10/2003 | Lusk | ......................... 415/4.2 |
| 6,984,899 B1 * | 1/2006 | Rice | ............................ 290/44 |

FOREIGN PATENT DOCUMENTS

| | | |
|---|---|---|
| DE | 195 14 499 | 9/1995 |
| ES | 8801407 | 5/1986 |
| FR | 893164 | 6/1944 |

* cited by examiner

*Primary Examiner*—Edward Look
*Assistant Examiner*—Dwayne J White
(74) *Attorney, Agent, or Firm*—Wenderoth, Lind & Ponack L.L.P.

(57) ABSTRACT

The present invention allows for the exploitation and transformation of eolic energy into mechanical or electric energy by means of coupling it to a fixed generator. The tower is a vertical structure that houses a vertical axis rotor and makes better use of the wind's thrust by producing a funnel and a tunnel effect over the rotor. This arrangement makes possible to obtain energy independently from the wind's direction and to use a greater range of wind intensities, avoiding stops due to great winds by incorporating a duly synchronized gate system that allows stopping, maintaining and regulating the wind-driven rotor.

9 Claims, 5 Drawing Sheets

EOLIC ENERGY TRANSFORMATION TOWER

FIELD OF THE INVENTION

The present invention allows for the exploitation and transformation of eolic energy into mechanical or electrical energy by coupling it to a fixed generator that allows obtaining the wind energy independently from the wind's direction and utilize a greater range of wind intensities, avoiding the stops that occur during great winds by incorporating a duly synchronized gate system that allows for the stop, maintenance and regulation of the wind-driven rotor.

BACKGROUND OF THE INVENTION

There are numerous existing inventions in the prior art that refer to the use of wind power. There are examples from ancient times, from using sails as propulsion means in water navigation, to the famous windmills of La Mancha used to mill flour, and more recently the wind turbines that have been erected in the mountain crests that are derived from the engines used to pump subterranean water and are oriented by means of wind vanes.

There are numerous constraints attached to the modern wind turbines; the main may be wind force and wind direction, which result in design complexity coupled with loss of effectiveness. Most of the models developed to date have a horizontal axis that is oriented according to the direction of the wind.

There are examples of wind mills designed during Ancient Times, such as the Persian Mill, which had a vertical axis, the Savonius Mill developed later, and more recently the Darrieus Rotor, although the latter has not been widely developed due to its fragility.

SUMMARY OF THE INVENTION

The EOLIC ENERGY TRANSFORMATION TOWER (EETT) consists in a vertical structure (FIG. (1)) that houses a vertical axis rotor and allows for a better utilization of wind power by producing a funnel effect and a tunnel effect over the rotor (FIG. (2)).

The invention (FIG. (1)) has one fixed structure (10) or housing that contains the operational mechanisms and enhances the wind power; one mobile structure that collects the wind power (11) by means of a vertical axis rotor with blades; and another fixed structure or conversion facility where the wind power is transformed (12) into, generally, electric energy.

The EETT has walls that make up its structure, preferably made from reinforced concrete. Each wall has triangular projections (8) (FIG. 5). The flat external part, facilitates the action of capturing the wind (4), and the circular inner part is adjusted to the rotor, allowing better use of the wind's current.

The purpose of these projections is to create the funnel effect and thus enhance the tunnel effect of the wind. They also serve to eliminate the wind's thrust over the returning blades and also to allow the mounting on the structure of gate-like devices (23) or sliding doors, that, equipped with the appropriate mechanism, control the entry of air going to the blades to be regulated and/or stopped. To avoid the entry of air, the gates must travel until they close (9) the inlet mouthpiece (4).

The building is covered to create the tunnel effect, avoid wind turbulence and protect the entire device from the weather. This arrangement also allows to use the building for other uses, such as fire surveillance watchtower, survey tower, site for nest installation, etc.

The structural walls of the building (16) that houses the rotor and the other elements allow for lateral assembly of additional EETTs (FIG. 5).

The vertical axis rotor is integrated by two, three or more blades or paddles (3), (preferably four), with a circular plant shape (FIG. (2)) and a tubular vertical axis (1) that supports the blades (FIG. 3). Each of the paddles or blades form a cylinder sector in such a manner that its aerodynamic shape facilitates rotation in the direction of the assembly and independently from the wind's direction (Figure D).

The rotor's axis must be built robustly in order to sustain the transmission forces and part of the weight of the blades. The blades themselves, on the contrary may be built of very light materials, such as: plastic, polyester, thin sheet metal, aluminum or other metals that would contribute to make the entire device easy to manufacture and maintain.

The blades are supported and given rigidity by means of metal profiles, horizontal elements or beams (21), and vertical elements or stanchions (18). In the lower part there are tapered rollers (13) that operate as roller guides that support the stanchions and avoid the removal of the blades' head ends. Also, each two consecutive blades are joined by bars (28) that supply rigidity to the set up.

The axis that supports the blades is mounted, on its lower part over a abutment (20) and an axial bearing (17) (FIG. 6) that are adjusted to the weight and dimensions of the rotor to be mounted; and on the upper part, the axis (1) is supported and held by two bearings mounted on the structure by means of the coupling of one or two steel beams (7).

According to the dimensions of the mast, more or less rigidity and/or greater support will be needed, as it is the case for the EETT structure. Depending on the size of the tower, it can be mounted in modules (2), stacked one on top of another, the mast having been equipped with the necessary coupling attachments (19) (FIG. 6).

In its lower part, the structure houses the equipment that transforms the wind's thrust (electric generator), the necessary set of brakes to control the rotor, and the coupling mechanism to join the generator to the rotor (FIG. 3). The axis is set on a cylindrical piece that serves as an abutment (20) to which the electric (6) and mechanical (5) brakes are attached. This crank journal is set over an axial bearing (17) which external side is shaped as dented wheel (24) to transmit the rotation by means of a gear pinion (15) to a gear box (11) to attain the multiplication or revolutions necessary to move the electric current generator (12) or any other type of machinery that operates by using the circular movement generated by the rotor.

Therefore, and contrary to current wind turbines, the generators or machines that can be coupled to the device are placed below the rotor structure at surface level, facilitating maintenance tasks and simplifying the mechanisms to harness and generate eolic energy.

Also, the transmission of the circular movement to the machines may be accomplished by means of pulleys and/or a trapezoidal transmission belt.

The platform that supports all the weight through the wheel and the axial bearing (14) will be assembled over columns (10), in a completely stationary manner, over pillars and beams that will preferably be made of reinforced concrete.

Pillars (14) are aligned in a circular arrangement under the tapered roller guides (13) and set in such a manner that they support the stanchions of the blades, the circular arrangement lends greater rigidity and avoids bending of the roller guides.

Therefore, the EETTs thus configured display an open surface (4) that allows the passage or air to the concave surface formed by the blades (3) (FIG. 2); the blades collect the wind's thrust and, due to their aerodynamic shape and the location and arrangement of the intake mouthpiece (4), the wind causes the rotor to gyrate independently of the direction of the wind. A greater use of lateral wind is achieved by attaching several EETTs in a staggered floor arrangement making use of the outer wall of each unit to serve as the dividing wall of the successively assembled units, that are configured according to the terrain conditions and availability; this scheme permits economization of one wall per each EETT assembled, improving costs, performance, and profitability of the invention.

DETAILED DESCRIPTION OF THE INVENTION

Figure 1:
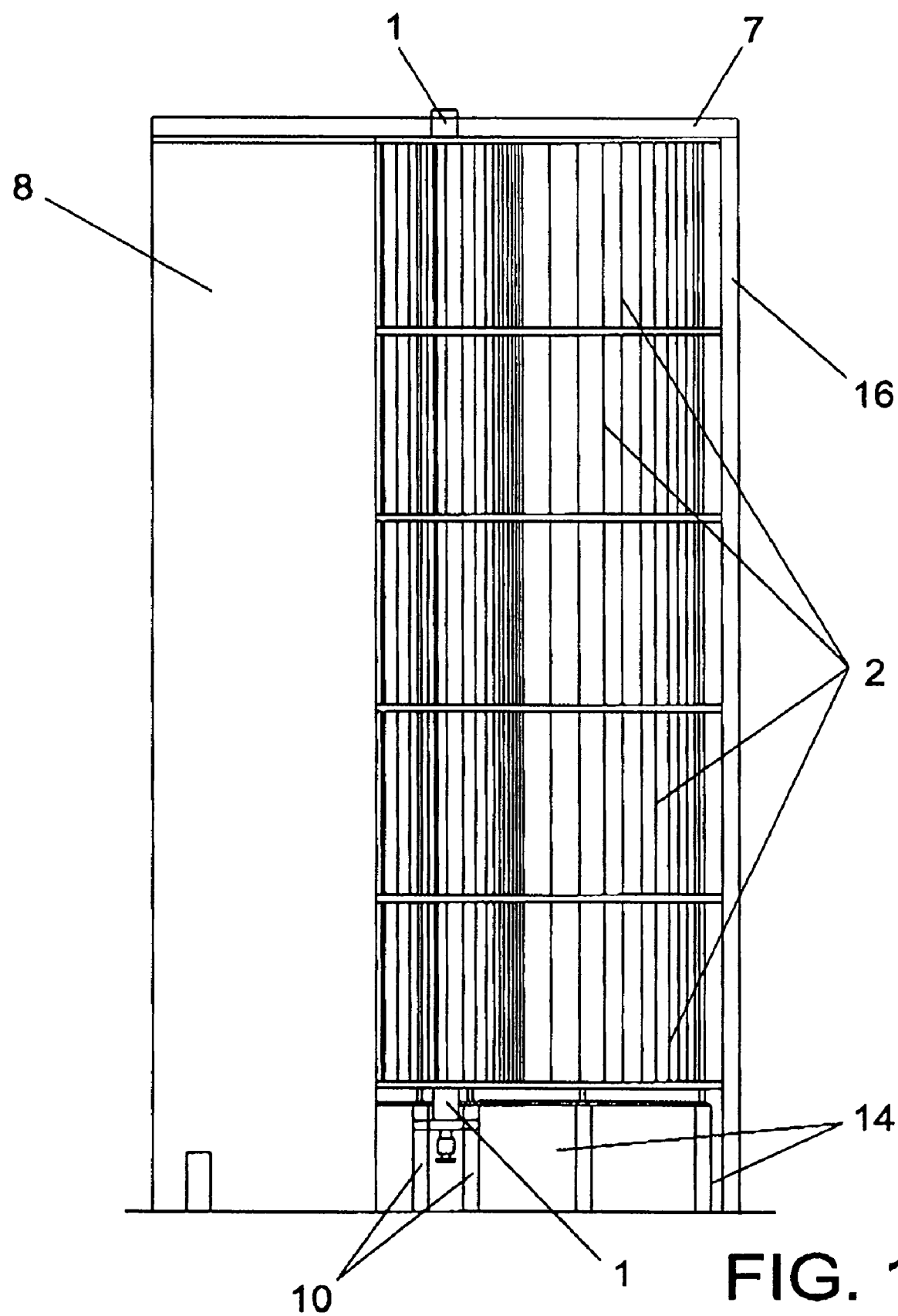
FIG. 1 illustrates the profile of the present invention with five overlapped modules (2). The section opened to receive air (mobile body/blades) can be easily seen (FIG. 2) due to the vertical stripes and the projections (8), the section of the structure that is enclosed and facilitates blade return and can also be seen in FIGS. (2) and (5). The wall faces (16) that protect them and constitute the EETT's enclosure are also shown. In the lower part the space that serves to house the generation and brake systems (FIG. (6)) can be seen, as well as the pillars (10) that support the rotor and the pillars (14) that are placed underneath the blade stanchions (part N° 18 in FIG. (2)). The beam (7) that supports the rotor's axis (1) is represented in the upper part.
Figure 2:
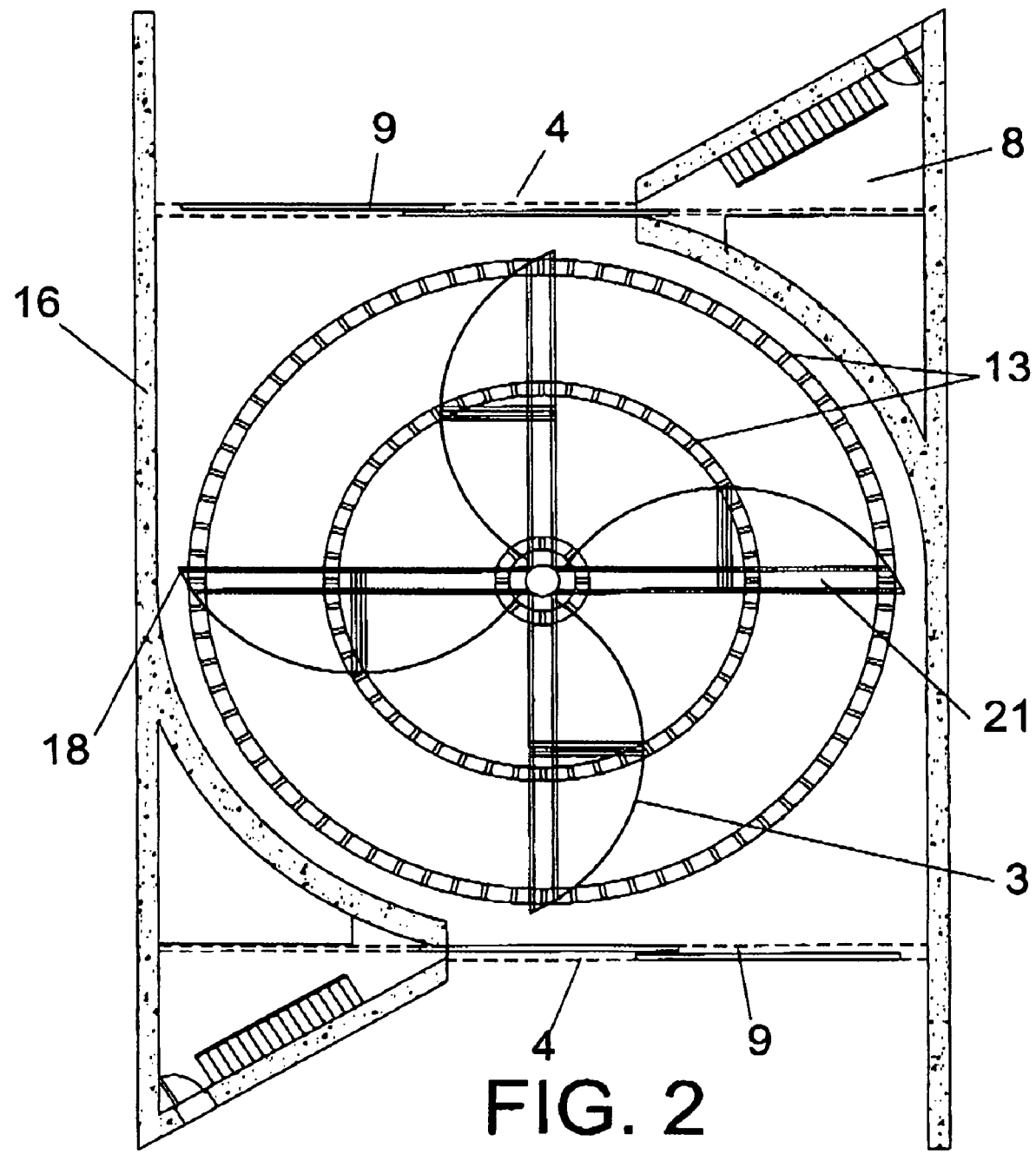
FIG. 2 illustrates the section of the present invention's structure that houses (3) the blades that collect the wind's thrust via the mouthpiece (4) (four blade configuration) due to the arrangement of the projections (8), the housing for the gates (9) that allow the maneuvers to close or regulate wind entry, the rolling guides of the bearings (13) for large towers, the beams that support the blades and the stanchions (18) that facilitate rotation over the rolling guides, and the attachment of the blades.
Figure 3:
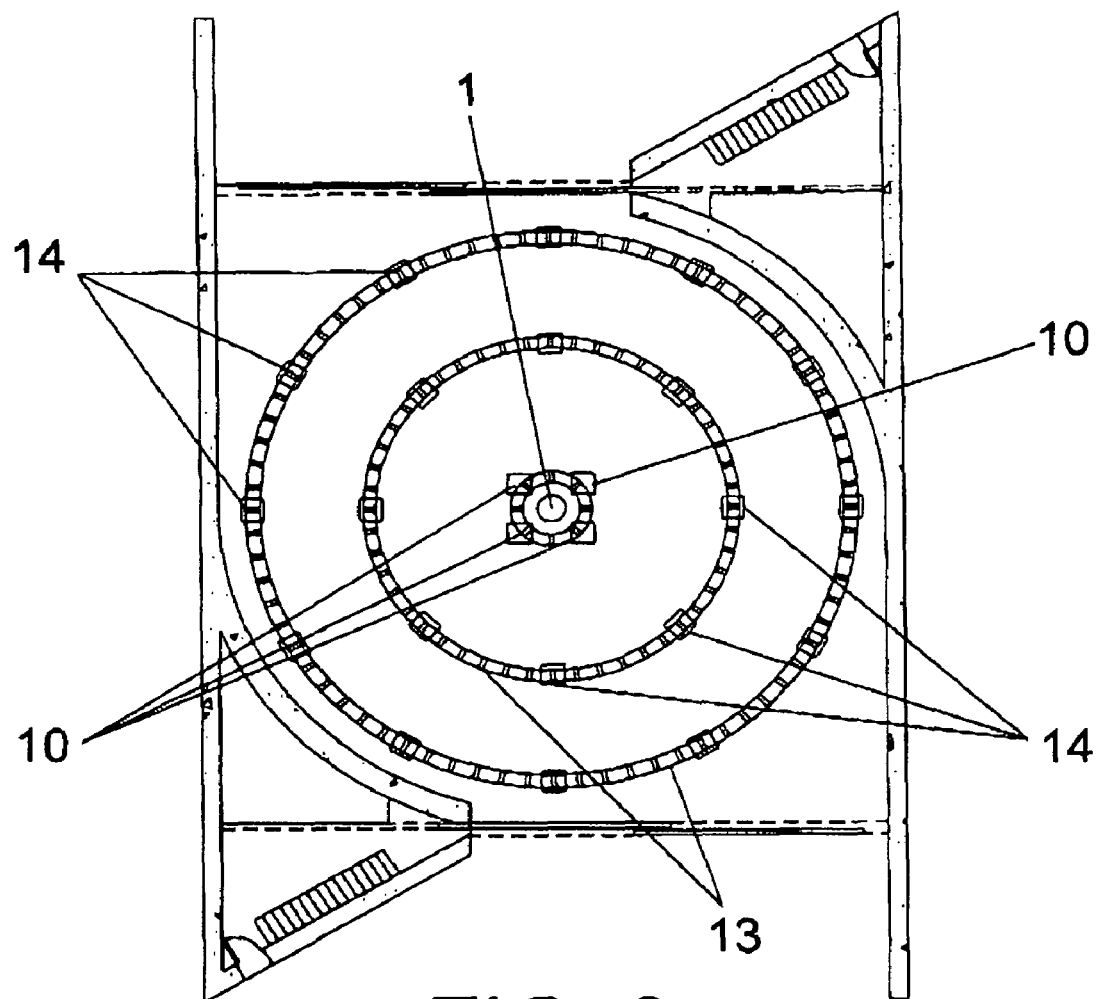
FIG. 3 illustrates a view of the platform where the rotor's axis (1) is supported and the blade stanchions showing the location of the pillars (10) that are arranged to support the rotor, and the pillars (14) over which the stanchion guides (13) are mounted.
Figure 4:
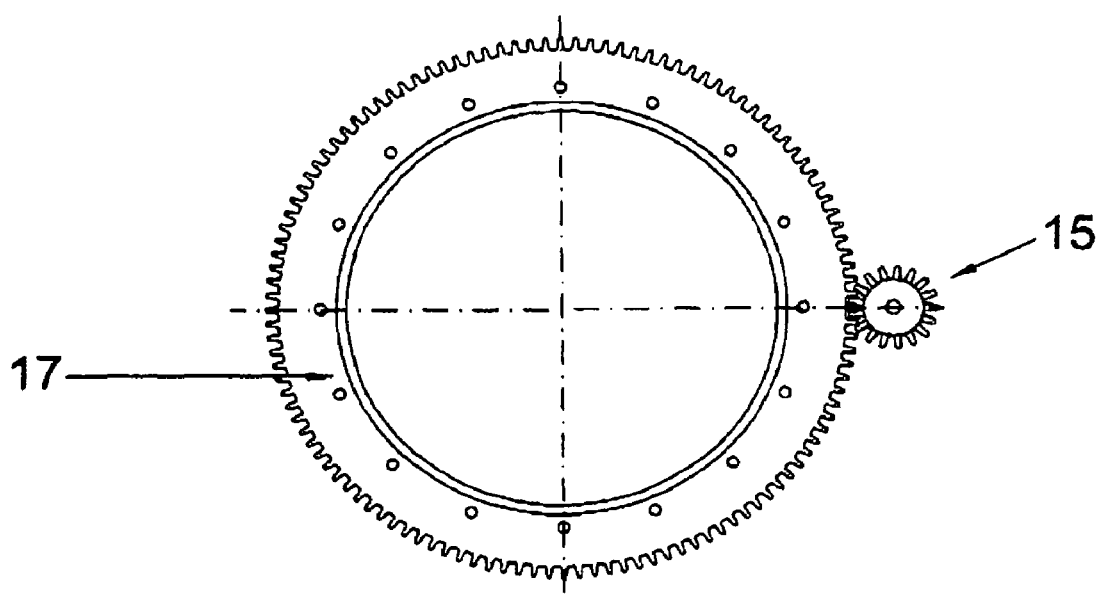
FIG. 4 illustrates a side of the coaxial bearing (17) and the gear pinion (15) that serves as link to the generator.
Figure 5:
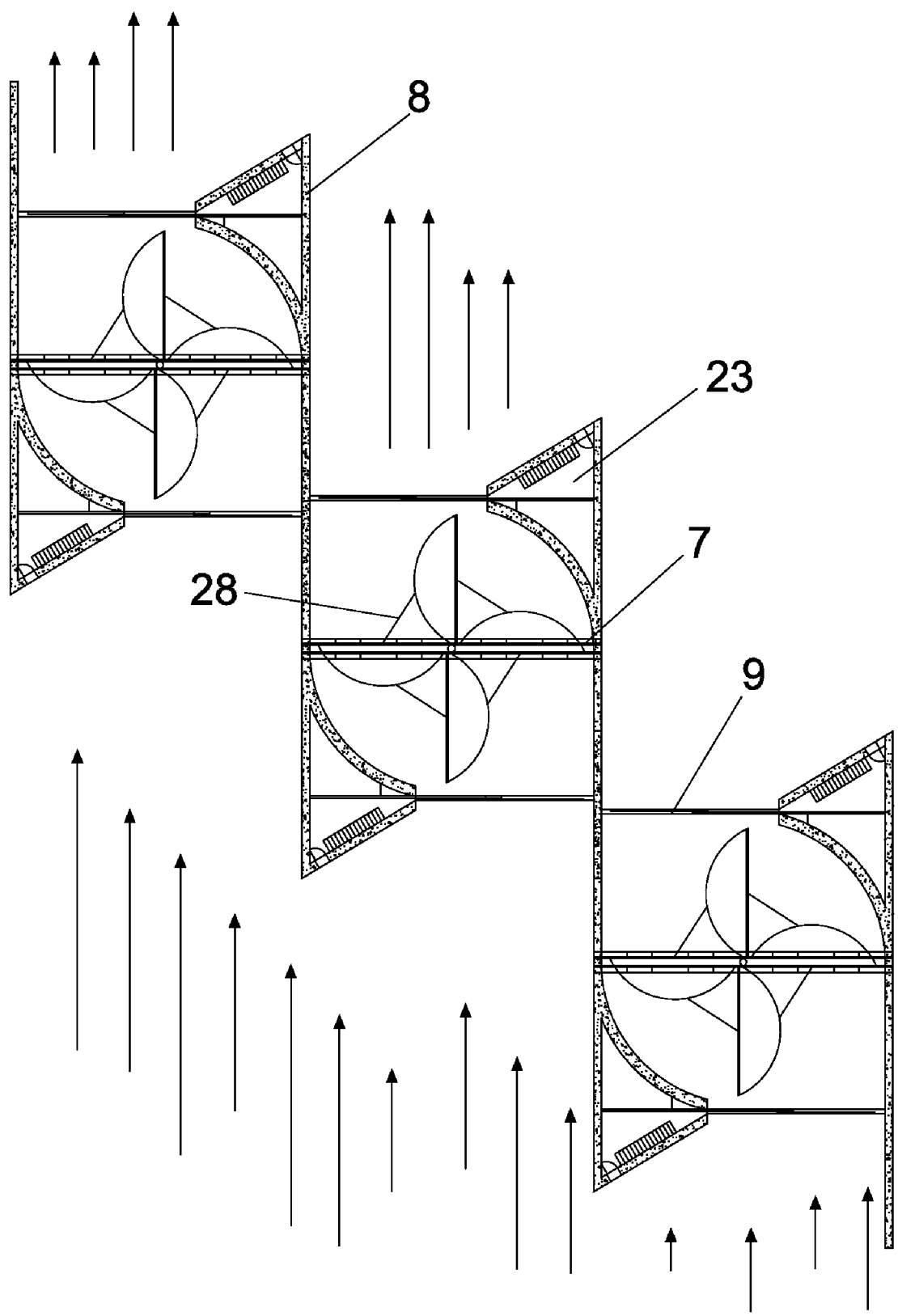
FIG. 5 illustrates the parallel assembly of several towers to show their attached arrangement and the saving of materials achieved with such a configuration. It shows the projections (8) that favor wind entry and reduce resistance to the blade's rotation. The bars (28) located every two blades lend rigidity to the rotor and the location of the gates in the open (23) or closed (9) positions.
Figure 6:
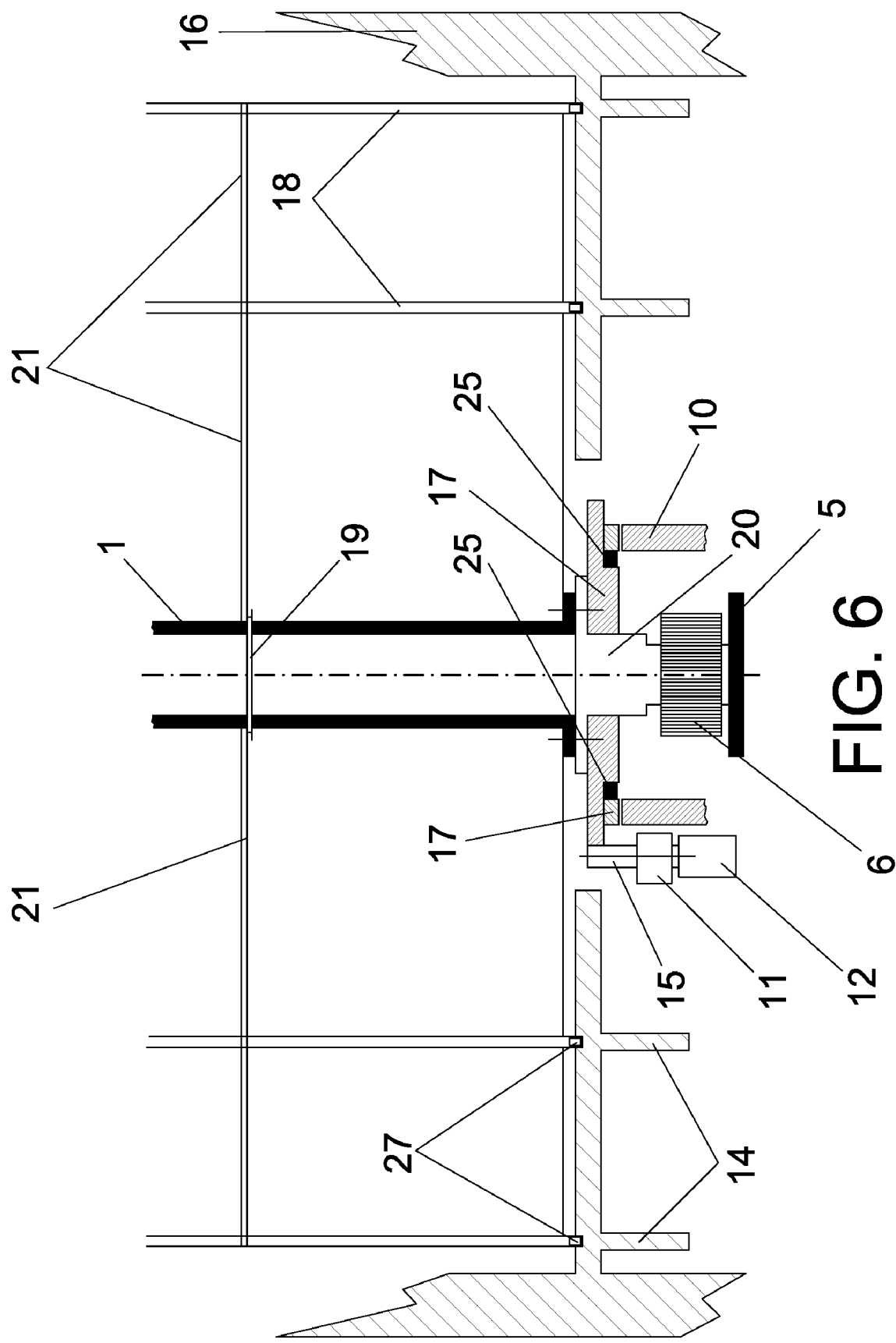
FIG. 6 illustrates a cut view of the profile showing the assembly of the mast (1) over a crank journal (20) and the axial bearing (17) that rests on the pillars (10). The electric (6) and mechanical (5) brakes are attached to the crank journal. The outer wheel of the axial bearing (17) is coupled to a gear pinion (15) that by means of a gear box (11) transmits the rotation to a turbine (12). The cut view shows the pillars (14) underneath the rolling guides (13) that serve as support to the stanchions (18).

This embodiment relates to the description of the invention and the Figures described previously.

This embodiment refers to a monolithic structure achieved by overlapping the modules (2) described above and may reach great heights. It makes use of the surface exposed to the wind from, practically, ground level to the top of the structure.

Each EETT portrayed in the description, approximately occupies a space of about twenty meters wide. This width can accommodate a large rotor, taking into account the gap that must be left between wall and rotor, that is of approximately one hundred and fifty centimeters, so as to not present obstacles to the wind current. The number of modules that can be stacked vertically will depend on the rigidity of the structure, considering that modules of approximately 6 meters high can be used to assemble structures of 50 or 60 meters high or taller.

Current wind turbines have a diameter of sixty to seventy-five meters and are sometimes larger. These wind turbines require the spacing between towers to be three to four times larger than the diameter of the rotor. This in-between distance, provided the terrain is relatively undulated, could accommodate 12 EETTs of the present invention. These EETTs can be placed in pairs successively assembled, since they do not produce a wake effect in the wind's path. Modular gates (9) are mounted in the wind intake or outlet, which have an opening slightly larger than the blade's radius, similarly to sliding doors that have two or more panels sliding horizontally. These gates are housed in the part of the structure that shelters (23) the returning blades from the wind. The gates are installed with a corresponding mechanism to regulate via computer the wind entry during hours of strong winds or when the turbine is not moving. The function of these gates during strong winds is very important, since they regulate the entry of wind at the generator's maximum power. In circumstances that force the wind turbines that are currently in the market to stop operating for safety reasons, the wind turbine object of the invention would be able to continue operating at maximum performance rates.

Due to the structure and the shape of the mouthpiece in which the EETTs are mounted, the wind moves as if it was traversing a tunnel (tunnel system), which increases the wind speed from thirty to thirty-three percent. This is why during moderate or weak winds, these EETTs continue to produce energy, contrary to current wind turbines, which rotors gyrate but are not producing energy.

If the turbine must be stopped, the gates are slide closed and/or the brakes mechanism activated. The brakes mechanism consists in an electrobrake and a disc brake similar to those used by very large tonnage trucks. These brakes can also be operated manually. In this manner, all the necessary operations can be done while sheltered from the inclement weather.

These EETT can reach speeds from twenty-five to thirty rpms, and the speed at the end of the blades would be of about eighty kilometers per hour, as compared to the wind turbines in the market that turn at fifteen to thirty rpms, but due to the length of their blades the speed at the end of the blades is of hundred and seventy kilometers per hour. This fact, together with the wind friction sustained by the underside of the blade at these speeds causes the wear of the materials to be very high.

These EETTs provide many advantages when compared to current wind turbines performance. The swept surface per square meter of terrain is several times lower and therefore the performance is greater. The wind turbines can be placed below or above ground level, but always below the structure that sustains the rotor. These wind turbines can operate at greater wind speeds and do not have to stop due to excess wind, which are the winds that produce more energy. The rotor that transmits power to the turbine does not need a computer, an engine or a rotor wheel to orient the blades in the direction of the wind. The EETTs do not need engines or other mechanisms to rotate the blades or computers to direct these maneuvers, since they can capture wind that moves in all directions. Also, the EETTs do not need a nacelle or counterweights to maintain the rotor's balance. The cables that transport the current produced by the generator do not suffer any torsion whatsoever, since the generator is located in a fixed point. Current generators require, when the rotor has turned three or four times, a computerized mechanism to eliminate the torsion caused to the cable. The length of the cables needed to transport the generator's current to the transformation center would be shorter if the wind turbines were to be built attached, and it would also be easier to execute and access, since the cables for current transportation would be installed in the basements or lower parts of the structure where the generators are housed.

The EETTs have lower impacts on the environment. The EETTs are very quiet because the generator is located at or below ground level, and the noise is attenuated by the insulating provided by the building itself or by the terrain, and also reduced because cooling is achieved with water or oil. The noise produced by the rotor blades is also reduced and dampened because the rotor is located inside the tower. Birds could nest in these buildings without fear of suffering any incident, since one part is protected by the construction and the other part is made opaque by the blades. Also, the turning is done at low speed, which allows the birds to perceive them as a large obstacle, avoiding crashing against them. The EETTs would solely be characterized as a vision of a building of large dimensions.

The invention claimed is:

1. An eolic energy transformation tower for coupling to a stationary generator to transform wind energy into mechanic or electric energy, said Eolic energy transformation tower comprising:
    a rotor comprising
        a vertical shaft secured at both ends;
        at least one roller guide;
        at least two curved blades joined to said vertical shaft, and being supported with at least one horizontal element, adjacent curved blades being interconnected with at least one bar; each of said curved blades comprising at least one vertical element sized and configured so as to be supported by said roller guide; and
        a coupling mechanism configured to transmit rotation of said vertical shaft to the stationary generator;
    a vertical structure housing said rotor and comprising;
        a top cover, at least two lateral walls, a frontal wall having a first opening part, a rear wall having a second opening part and a platform;
        each lateral wall of said at least two lateral walls being shared by an adjacent tower in a multiple tower arrangement, and
        each lateral wall of said at least two lateral walls having a triangular projection, said triangular projection of one lateral wall of said at least two lateral walls being located at an opposite end of said vertical structure to a location of said triangular projection of another lateral wall of said at least two lateral walls, and each triangular projection projecting to an interior of said vertical structure;
    wherein said eolic energy transformation tower is arranged in a tower system comprising at least two vertical structures in staircase positioning when viewed from above, one lateral wall of one vertical structure being arranged to redirect wind to the curved blades of another vertical structure for obtaining wind energy independently from the direction of the wind.

2. An eolic energy transformation tower according to claim 1, wherein a surface of each of the curved blades directed toward the wind comprises a concave semi-cylindrical shape.

3. An eolic energy transformation tower according to claim 1, wherein each of said first and second opening parts is an adjustable synchronized gate system for controlling the wind entry of the rotor, by regulating said opening parts in order to maintain the maximum power of the generator.

4. An eolic energy transformation tower according to claim 1, wherein said at least one roller guide is attached to the platform and comprises tapered rollers to avoid the removal of head ends of the blades and further to support the vertical elements.

5. An eolic energy transformation tower according to claim 1, wherein the horizontal element is a beam, and the vertical element is a stanchion for supporting each of said curved blades; said beam and said stanchion being provided with metal profiles to provide rigidity.

6. An eolic energy transformation tower according to claim 5, wherein said vertical shaft includes a lower part and an upper part; said lower part being secured by a trunnion and an axial bearing, and said upper part being secured by two bearings coupled with at least one steel beam located on said top cover.

7. An eolic energy transformation tower according to claim 1, wherein the curved blades are built in stackable modules so that vertical elements adjacent the curved blades of a first stackable module are joined with vertical elements adjacent the curved blades of a second stackable module located below the first stackable module in order to provide support and rigidity.

8. An eolic energy transformation tower according to claim 1, wherein the curved blades are made of a material selected from the group consisting of: plastic, polyester, thin sheet metal and aluminum.

9. An eolic energy transformation tower according to claim 1, wherein each triangular projection has the same size and shape as each other triangular projection.

* * * * *